United States Patent
Skidmore et al.

(10) Patent No.: US 9,673,462 B2
(45) Date of Patent: Jun. 6, 2017

(54) FUEL CELL-VEHICLE COMMUNICATIONS SYSTEMS AND METHODS

(71) Applicant: PLUG POWER INC., Latham, NY (US)

(72) Inventors: Dustan Lee Skidmore, Clifton Park, NY (US); John Douglas Usborne, Delta (CA); Dayton Simmons, Albany, NY (US)

(73) Assignee: PLUG POWER INC., Latham, NY (US)

( * ) Notice: Subject to any disclaimer, the term of this patent is extended or adjusted under 35 U.S.C. 154(b) by 239 days.

(21) Appl. No.: 13/721,627

(22) Filed: Dec. 20, 2012

(65) Prior Publication Data

US 2013/0157157 A1   Jun. 20, 2013

Related U.S. Application Data

(60) Provisional application No. 61/577,777, filed on Dec. 20, 2011.

(51) Int. Cl.

| | |
|---|---|
| *B60L 7/18* | (2006.01) |
| *H01M 8/04298* | (2016.01) |
| *H01M 8/04828* | (2016.01) |
| *H01M 8/0438* | (2016.01) |
| *H01M 8/04537* | (2016.01) |

(Continued)

(52) U.S. Cl.
CPC ......... *H01M 8/04298* (2013.01); *B60L 1/003* (2013.01); *B60L 3/0053* (2013.01); *B60L 7/18* (2013.01); *B60L 11/1862* (2013.01); *B60L 11/1883* (2013.01); *B60L 11/1885* (2013.01); *B60L 11/1887* (2013.01); *B60L 11/1892* (2013.01); *B60L 11/1898* (2013.01); *H01M 8/0494* (2013.01); *H01M 8/04388* (2013.01); *H01M 8/04656* (2013.01); *B60L 2240/12* (2013.01); *B60L 2240/36* (2013.01); *B60L 2240/547* (2013.01); *B60L 2240/549* (2013.01); *B60L 2250/16* (2013.01); *H01M 2250/20* (2013.01); *Y02T 10/705* (2013.01);
(Continued)

(58) Field of Classification Search
CPC .......................... H01M 8/04298; H01M 8/04
USPC .................................... 429/428–451
See application file for complete search history.

(56) References Cited

U.S. PATENT DOCUMENTS

| | | | |
|---|---|---|---|
| 5,401,589 A * | 3/1995 | Palmer et al. | 429/408 |
| 2004/0217736 A1 * | 11/2004 | Bischoff | 320/119 |

(Continued)

FOREIGN PATENT DOCUMENTS

| | | | | |
|---|---|---|---|---|
| WO | WO 2011/161814 | * | 12/2011 | B60L 3/00 |

OTHER PUBLICATIONS

U.S. Serial No. 13/665,248, filed Oct. 31, 2012, entitled "Method to Control Current in a Fuel Cell System".

*Primary Examiner* — James Lee
(74) *Attorney, Agent, or Firm* — Heslin Rothenberg Farley & Mesiti P.C.; Victor A. Cardona, Esq.

(57) ABSTRACT

A method for operating a fuel cell system includes electrically coupling a fuel cell stack to an energy storage device and an electrical demand by a load device. A controller is coupled to the fuel cell stack, the energy storage device, and the load device via a communications connection. The controller obtains information relative to an operation of at least one of the fuel cell stack and the energy storage device and the controller controls an operation of the load device based on the information.

8 Claims, 2 Drawing Sheets

(51) Int. Cl.
*B60L 11/18* (2006.01)
*B60L 1/00* (2006.01)
*B60L 3/00* (2006.01)

(52) U.S. Cl.
CPC ............ *Y02T 10/7044* (2013.01); *Y02T 90/16* (2013.01); *Y02T 90/32* (2013.01); *Y02T 90/34* (2013.01)

(56) References Cited

U.S. PATENT DOCUMENTS

| | | | |
|---|---|---|---|
| 2005/0061562 A1* | 3/2005 | Mack | 180/65.2 |
| 2006/0150937 A1* | 7/2006 | Lupo | F02D 41/042 123/179.4 |
| 2008/0185912 A1* | 8/2008 | Tighe | 307/10.1 |
| 2008/0241614 A1* | 10/2008 | McCanney | 429/20 |
| 2010/0136379 A1* | 6/2010 | King | H01M 8/04619 429/432 |
| 2011/0086740 A1* | 4/2011 | Suzuki et al. | 477/5 |
| 2013/0096764 A1* | 4/2013 | Yamamoto | B60K 6/445 701/22 |

\* cited by examiner

FUEL CELL-VEHICLE COMMUNICATIONS SYSTEMS AND METHODS

CROSS-REFERENCE TO RELATED APPLICATIONS

This application claims priority to U.S. Provisional patent application No. 61/577,777 filed on Dec. 20, 2011, entitled "Fuel Cell-Vehicle Communications Systems and Methods", the entire disclosure of which is incorporated herein by reference.

This application is also related to U.S. Ser. No. 13/665,248 filed on Oct. 31, 2012, entitled "Method to Control Current in a Fuel Cell System", which claims priority to U.S. Provisional Application No. 61/553,656 filed on Oct. 31, 2011, the entire disclosures of which are incorporated herein by reference

TECHNICAL FIELD

This invention relates generally to fuel cells and fuel cell systems, more particularly to methods for communication between a fuel cell system and a vehicle such as an industrial electric vehicle.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive, aerospace, industrial, residential) environments, for multiple applications.

A Proton Exchange Membrane (hereinafter "PEM) fuel cell converts the chemical energy of fuels such as hydrogen and oxidants such as air directly into electrical energy. The PEM is a sold polymer electrolyte that permits the passage of protons (i.e., H+ ions) from the "anode" side of the fuel cell to the "cathode" side of the fuel cell while preventing passage there through of reactant fluids (e.g., hydrogen and air gases). The membrane electrode assembly is placed between two electrically conductive plates, each of which has a flow passage to direct the fuel to the anode side and oxidant to the cathode side of the PEM.

Two or more fuel cells can be connected together to increase the overall power output of the assembly. Generally, the cells are connected in series, wherein one side of a plate serves as an anode plate for one cell and the other side of the plate is the cathode plate for the adjacent cell. Such a series of connected multiple fuel cells is referred to as a fuel cell stack. The stack typically includes means for directing the fuel and the oxidant to the anode and cathode flow field channels, respectively. The stack also usually includes a means for directing a coolant fluid to interior channels within the stack to absorb heat generated by the exothermic reaction of hydrogen and oxygen within the fuel cells. The stack also generally includes means for exhausting the excess fuel and oxidant gases, as well as product water.

In some fuel cell systems, the fuel cell is coupled in parallel with an energy storage device (e.g., battery, capacitor, etc.) which is then coupled to a load. Commonly referred to as a hybrid system, peak power from the system is supplied by the energy storage device while the fuel cell provides the average power needs of the application. In most hybrid systems a voltage converter is used to convert the fuel cell stack voltage to the energy storage device voltage. In these types of systems, the fuel cell can operate independently from the energy storage device.

Another type of hybrid system eliminates the need for the voltage converter and couples the fuel cell stack directly to the energy storage device. In this system the fuel cell stack voltage, energy storage device voltage and load voltage are equal. The current output of the fuel cell is therefore dictated by the polarization curve of the fuel cell being used. Therefore, the voltage of the system controls the current output of the fuel cell.

In addition to the energy storage device, many fuel cell systems include a balance of plant that supplies the necessary reactant and cooling fluids for a fuel cell or fuel cell stack. The balance of plant may include devices such as pumps, air compressors, blowers, fans, valves, and sensors. These devices function cohesively to provide power to a load, such as a stationary device or an industrial electric vehicle (e.g., a forklift truck).

An electronic system controller conditions the signals from the sensors and commands the actuators in order to operate the fuel cell system. The software in the system controller is typically designed to optimize one or more aspects of the fuel cell system, such as output power, efficiency, safety, fuel cell life, battery life, etc. In the case of a load such as an industrial electric vehicle, these optimizations can be achieved more easily if the fuel cell system has some knowledge of, or control over, the load.

Thus, there is a need for a means to allow the fuel cell system to communicate with a load, such as an industrial electric vehicle, in order to optimize the operation of the combined fuel cell and vehicle system.

SUMMARY OF THE INVENTION

The present invention provides a method to allow the communication of information between a fuel cell system and an industrial electric vehicle in order to optimize system performance and safety.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION

Figure 1:
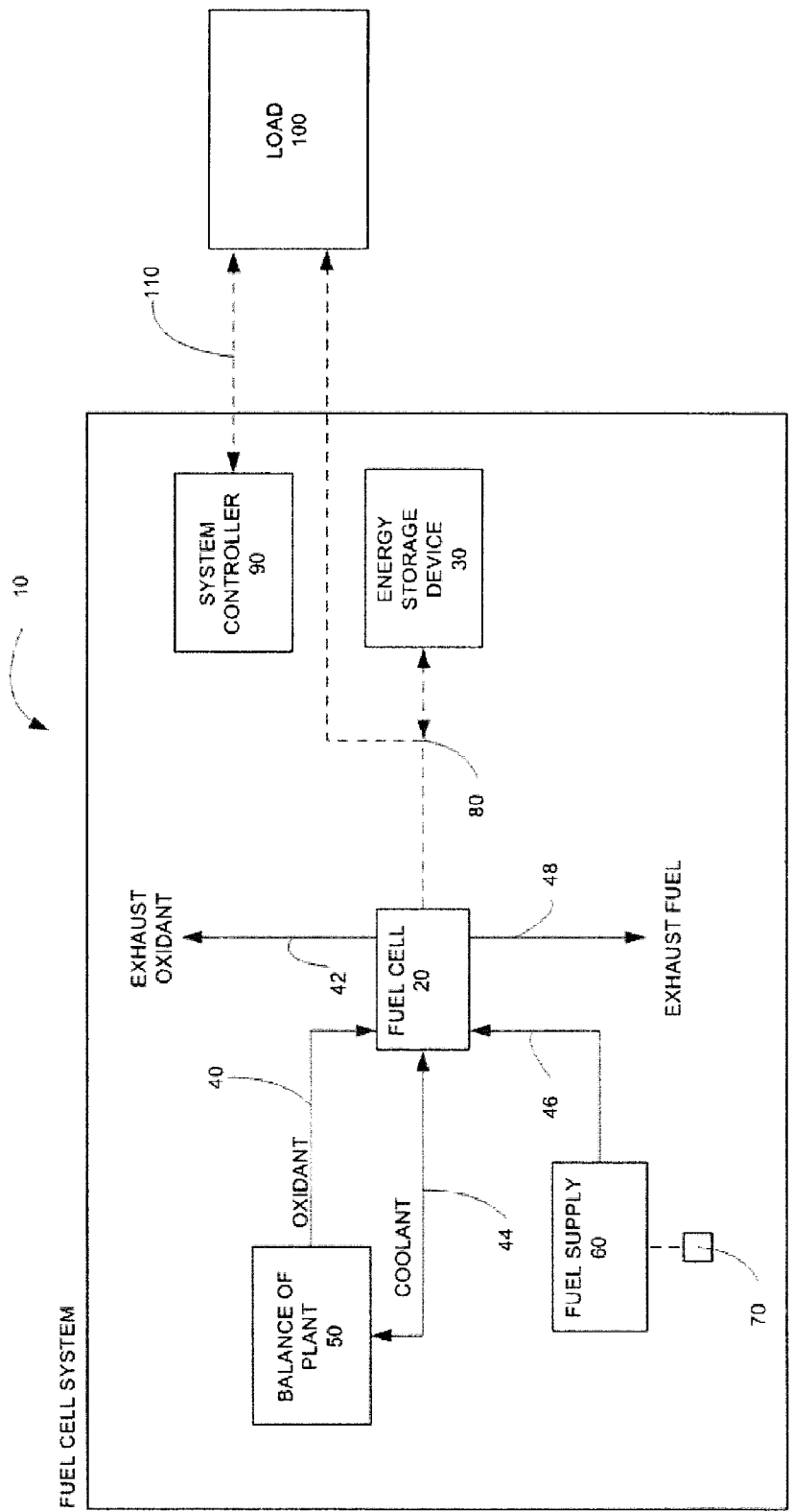
FIG. 1 is a block diagram of a fuel cell system and vehicle in accordance with the invention
Figure 2:
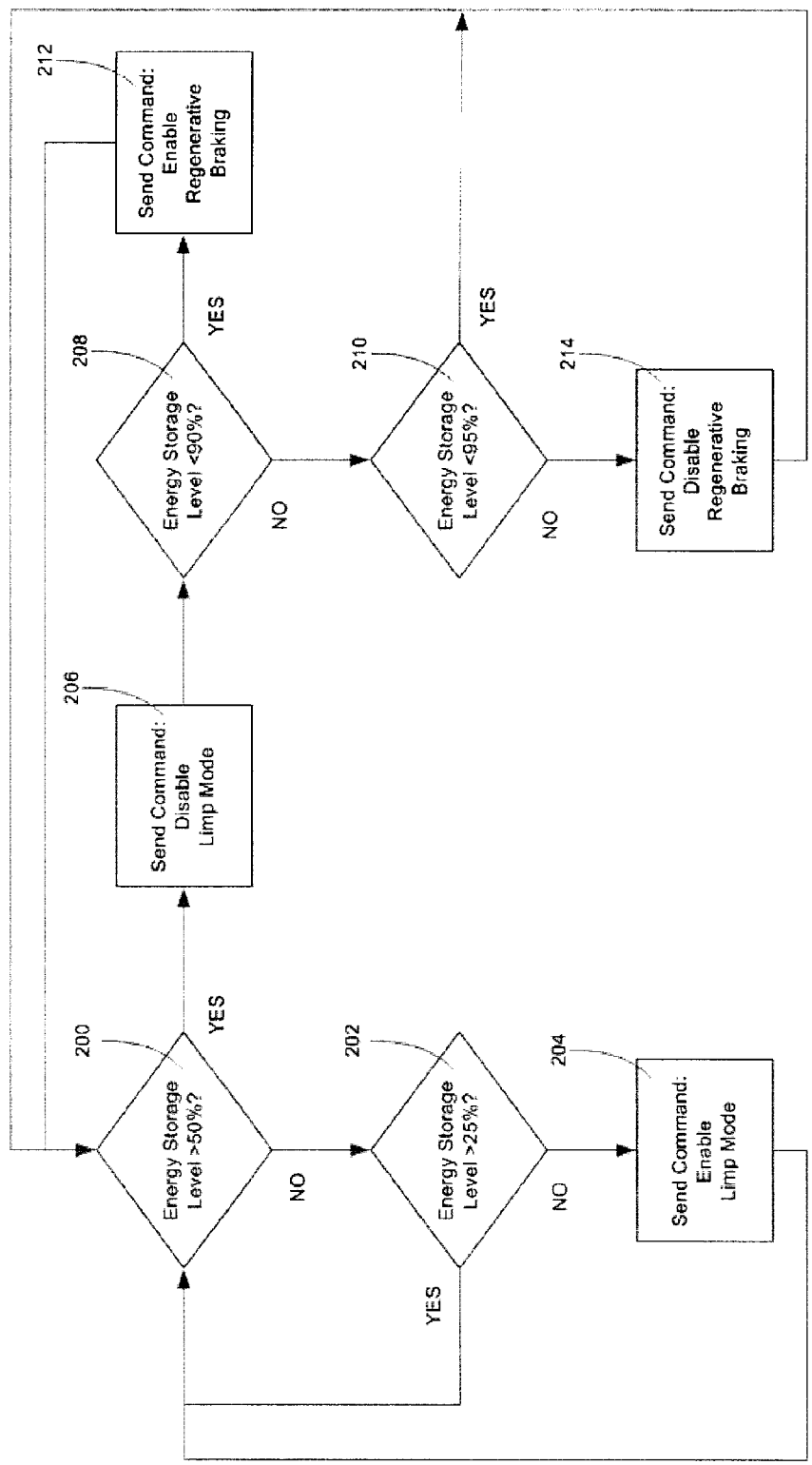
FIG. 2 is an example of system optimization using a communication protocol

An example of a fuel cell system which incorporates the novel features of the present invention is depicted in FIG. 1-2 and described in detail herein.

In the embodiment depicted in FIG. 1, a fuel cell system 10 is referred to as the assembled, or complete, system that, together with all parts thereof, produces electricity and typically includes a fuel cell 20 and an energy storage device 30. The fuel cell is supplied with fuel, for example, hydrogen, through a fuel inlet 46. Excess fuel is exhausted from the fuel cell through a fuel exhaust 48. Oxidant, for example, air, is supplied through an oxidant inlet 40 and excess oxidant is exhausted from an oxidant exhaust 42. The fuel cell reactants and a cooling fluid 44 are supplied by a fuel supply 60 and other components of balance of plant 50, which may include compressors, pumps, valves, fans and sensors. A controller 90 uses feedback from sensors in balance of plant 50 and fuel supply 60 to control actuators in balance of plant 50 and fuel supply 60.

Referring to FIG. 1, an electrical demand or load 100, for example an industrial electric vehicle (e.g., an electrically powered forklift truck), is connected to energy storage device 30 and fuel cell 20 in parallel by electrical connection 80. Depending on the demand, power may flow from energy storage device 30, fuel cell 20 or both to the load. In times of high demand in excess of the maximum power output of the fuel cell 20, power will flow from both the fuel cell 20 and energy storage device 30. In times of low demand, power can flow to load 100 from fuel cell 20, while excess power from fuel cell 20 can flow into energy storage device 30 to recharge it when required. In the case of loads that can source power, such as regenerative braking, power may flow from load 100 to energy storage device 30.

System controller 90 communicates with the load 100 through a communication connection 110. The connection may be a hard wire, wireless connection (e.g., via a Wi-Fi, Bluetooth or cellular connection, or both. The signals in the connection may be digital or analog. A communication protocol such as RS-232, RS-485, Controller Area Network (CAN) or wireless protocol may be used to transfer information bi-directionally.

Communication connection 110 allows fuel cell system 10 and load 100 to identify each other and communicate operating limits before and during operation. These limits may include, but are not limited to, operating voltage limits, maximum power draw, maximum allowable regenerative current (i.e., current flowing from load 100 to energy storage device 30), range (i.e., run time using fuel in fuel supply 60 based on fuel level as read by fuel sensor 70), and any active faults that may affect operation.

Communication connection 110 may also be used to transmit a status of fuel cell system 10 to load 100 and/or controller 90. The status may include, but is not limited to, an operating state (e.g., startup, running, fueling), fuel level remaining, energy remaining, maximum allowable power draw, output voltage, active faults, balance of plant sensor readings (e.g., coolant temperature, oxidant flow rate), and current configuration (e.g., software versions, installed options). This information may be displayed on a user interface (e.g., dashboard of an industrial electric vehicle) of the load or downloaded through the load's service port. The feedback on the load's user interface may be visible (e.g., warning light), audible (e.g., buzzer) or tactile (e.g., vibration of control surfaces).

Conversely, the load may use connection 110 to transmit its status to the fuel cell system. The status may include, but is not limited to, operating state (e.g., startup, running, emergency stop), active faults codes, current configuration (e.g., software versions, installed options), and state of user inputs (e.g., gas pedal depressed, key switch in start position, emergency stop button depressed). Using this information, fuel cell system 10 may react in the appropriate way, for example starting up when the key switch is moved to the start position or shutting down when the emergency stop button is depressed.

Communication connection 110 may be used to improve the safety of system 10. For example, during fueling of the fuel cell system 10, the system may communicate its state (i.e., fueling) to load 100, e.g., an industrial electric vehicle, and/or controller 90. The vehicle may then place itself in a safe state for fueling or controller 90 may send a message to the vehicle to cause the vehicle to be placed in such a safe state. This state may prevent the operator from moving the vehicle while the system is fueling. The safe state may also cause the vehicle electrical system to be de-energized to eliminate ignition sources during the transfer of fuel to the fuel cell system. In one example, fuel cell system 10 may be coupled to controller 90 such that controller 90 receives an indication that fueling is occurring and thus may control the vehicle (e.g., preventing motion or ignition sources) during the fueling of fuel cell system 10.

The information transmitted through communication connection 110 may also be used to adjust the operating envelope of the combined fuel cell and load system in situ (i.e., fuel cell system 10 and load 100). For example, fuel cell system 10 may be coupled to an industrial electric vehicle represented by load 100 where the vehicle has the ability to reduce its power draw by entering a "limp" mode in which a top speed of the vehicle is reduced. Furthermore, the vehicle may have regenerative braking and the ability to turn off its regenerative braking on command. Also, commands may be sent from the fuel cell system 10 to load 100 (e.g., the industrial electric vehicle).

In an example depicted in FIG. 2, fuel cell system 10 determines an amount of energy remaining (energy storage level) in energy storage device 30. If the level is not greater than a predetermined maintenance level (e.g., 50%), the fuel cell system proceeds to step 202. If the energy storage level is not greater than a predetermined cut-off level (25%), the system enters step 204 and the fuel cell system (e.g., controller 90) sends an "Enable Limp Mode" command to load 100 (e.g., an industrial electrical vehicle) using communication connection 110. The load receives this command and limits its top speed to 50% of the maximum value, or another reduced speed to conserve energy. This reduces the load on fuel cell system 10, allowing energy storage device 30 to recharge. The process returns to step 200 and continues to return to step 204 until the energy storage level in energy storage device 30 is greater than the cut-off level (e.g., 25%). The system then cycles between steps 200 and 202 until the energy storage level exits the 25%-50% range (i.e., the range including the cut-off level and the predetermined maintenance level). This provides hysteresis for the "limp" mode commands.

If the energy storage level in energy storage device 30 exceeds the maintenance level (e.g., 50%), fuel cell system 10 proceeds to step 206 and sends the "Disable Limp Mode" command to load 100, such as an industrial electric vehicle. The load then changes its top speed limit to the maximum value. Fuel cell system 10 continues to step 208. If the energy storage level in energy storage device 30 is not less than a desired maintenance level (e.g., 90%), the fuel cell system proceeds to step 210. If the energy storage level is not less than a maximum level (e.g., 95%), the fuel cell system sends the "Disable Regenerative Braking" command. In response, the load or vehicle disables regenerative braking to avoid overcharging energy storage device 30. When the energy storage level is not less than the desired maximum (e.g., 95%), the fuel cell system returns to step 208 through steps 200 and 206. If the energy storage level is less than the desired maintenance level (e.g., 90%), the fuel cell system proceeds to step 212 and sends the "Enable Regenerative Braking" command. If the energy storage level is between 90% & 95%, the system cycles between steps 200 and 210 (passing through steps 206 & 208). This provides hysteresis for the regenerative braking command.

If the energy storage level is less than 90%, the fuel cell system sends the "Enable Regenerative Braking" command. In response, the load or vehicle enables regenerative braking. Fuel cell system 10 then returns to step 200.

Various aspects of the fuel cell system described above (e.g., fuel cell system 10), such as a fuel cell stack, energy storage device, electrical demand, and a controller, may include various sensors utilized to determine various parameters relative to the aspects of the fuel cell system which may be coupled to a controller (e.g., controller 90) and/or the other aspects (e.g., fuel cell stack 20, energy storage device 30, and load 100) of the fuel cell system to allow control of the fuel cell system by the controller.

The controller (i.e., controller 90) described above, could be any type of computing unit (e.g., a personal computer operating a WINDOWS operating system or Apple OSX operating system, a Unix system, a microprocessor (which may or may not utilize a BIOS or operating system) or a mobile computing device such as a tablet computer or smart phone) configured to communicate with a fuel cell (fuel cell 20), an energy storage device (energy storage device 30), a balance of a plant (e.g., balance of plant 50), fuel supply (e.g., fuel supply 60), and/or a load (e.g., load 100). Further, the controller (e.g., controller 90) could be a unit separate from the fuel cell stack, energy storage device, and load device. Further, such a controller could be part of one or more of these components (e.g., a fuel cell, load device, and energy storage device) or could be distributed between these devices and other connected systems, such as balance of plant 50 while the distributed portions of such controller could be coupled to each other to allow communication therebetween.

The load (e.g., load 100) described above could be any type of stationary or moveable load device, such as an industrial electrical vehicle or forklift truck. The fuel cell (e.g., fuel cell stack 20) could be any type of fuel cell such as a proton exchange membrane fuel cell, solid oxide fuel cell, or any other fuel cell as would be known by one of ordinary skill in the art. The energy storage device (e.g., energy storage device 30) described above could be any type of battery or other way of storing energy such as a lithium ion battery, lead acid battery, air compression energy storage device, water storage device, capacitor, ultra-capacitor, or any other device for storing energy.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for operation of a fuel cell system comprising:
    electrically coupling a fuel cell stack to an energy storage device and an electrical demand by an industrial electrically powered vehicle;
    coupling a controller to the fuel cell stack, the energy storage device and the industrial electrically powered vehicle via a communications connection;
    the controller obtaining a first charge status of the energy storage device, the first charge status of the energy storage device being less than a previous charge status due to the energy storage device supplying electrical energy to the vehicle to drive an electrical motor to drive wheels to cause movement of the vehicle, and the controller limiting a top speed of the industrial electrically powered vehicle during operation of the vehicle to reduce a load on the fuel cell stack in response to the first charge status being below a minimum desired charge status;
    charging the energy storage device during operation of the vehicle via electrical energy generated by the fuel cell stack;
    the controller obtaining a second charge status of the energy storage device and comparing the second charge status to the minimum desired charge status;
    the controller ceasing to limit the top speed of the industrial electrically powered vehicle during operation of the industrial electrically powered vehicle in response to the comparing of the second charge status to the minimum desired charge status to allow an increased load on the fuel cell stack;
    the controller obtaining a third charge status of the energy storage device and comparing the third charge status to a maximum desired charge status of the energy storage device, and the controller disabling a regenerative braking system of the vehicle for providing electrical energy to the energy storage device in response to the third charge status exceeding the maximum desired charge status;
    the controller obtaining a fourth charge status of the energy storage device and comparing the fourth charge status to the maximum desired charge status of the energy storage device, and the controller enabling the regenerative braking system during operation of the vehicle in response to the fourth charge status being less than the maximum desired charge status.

2. The method of claim 1 further comprising the controller obtaining information relative to a fueling status of the fuel cell stack and the controller preventing movement of the industrial electrically powered vehicle in response to the controller receiving information that the fuel cell stack is being refueled and the controller de-energizing an electrical system of the vehicle while the fuel cell stack is being refueled to eliminate ignition sources during a transfer of fuel to the fuel cell stack.

3. The method of claim 1 further comprising power flowing from the stack and the energy storage device to the industrial electrically powered vehicle in response to an increase in an amount of the demand.

4. The method of claim 1 further comprising power flowing from the stack to the energy storage device in response to a decrease in an amount of the demand.

5. The method of claim 1 further comprising power flowing from the stack to the energy storage device and the industrial electrically powered vehicle in response to a decrease in an amount of the demand.

6. The method of claim 1 wherein the maximum desired charge status is 95 percent.

7. A method for operation of a fuel cell system comprising:
    electrically coupling a fuel cell stack to an energy storage device and an electrical demand by an industrial electrically powered vehicle;
    coupling a controller to the fuel cell stack, the energy storage device and the industrial electrically powered vehicle via a communications connection; and
    the controller obtaining information relative to a fueling status of the fuel cell stack and in response to the controller receiving information that the fuel cell stack is being refueled the controller de-energizing an electrical system of the vehicle while the fuel cell stack is being refueled to prevent movement of the industrial electrically powered vehicle and to eliminate ignition sources during a transfer of fuel to the fuel cell stack;
operating the electrically powered vehicle;
the controller obtaining a first charge status of the energy storage device, the first charge status of the energy storage device being less than a previous charge status due to the energy storage device supplying electrical energy to the vehicle to drive an electrical motor to drive wheels to cause movement of the vehicle, and the controller limiting a top speed of the industrial electrically powered vehicle during operation of the vehicle to reduce a load on the fuel cell stack in response to the first charge status being below a minimum desired charge status;
charging the energy storage device during operation of the vehicle via electrical energy generated by the fuel cell stack;
the controller obtaining a second charge status of the energy storage device and comparing the second charge status to a second minimum desired charge status, the second minimum desired charge status greater than the minimum desired charge status;
the controller ceasing to limit the top speed of the industrial electrically powered vehicle during operation of the vehicle to allow an increased load on the fuel cell stack by the vehicle in response to the comparing of the second charge status to the second minimum desired charge status and the second charge status exceeding the second minimum desired charge status;
the controller obtaining a third charge status of the energy storage device and comparing the third charge status to a maximum desired charge status of the energy storage device, and the controller disabling a regenerative braking system of the vehicle for providing electrical energy to the energy storage device in response to the third charge status exceeding the maximum desired charge status;
the controller obtaining a fourth charge status of the energy storage device and comparing the fourth charge status to the maximum desired charge status of the energy storage device, and the controller enabling the regenerative braking system during operation of the vehicle in response to the fourth charge status being less than the maximum desired charge status.

8. The method of claim 7 wherein the minimum desired charge status is 25 percent, the second minimum desired charge status is 50 percent, and the maximum desired charge status is 95 percent.

* * * * *